United States Patent
Kumeuchi et al.

(10) Patent No.: US 7,556,889 B2
(45) Date of Patent: Jul. 7, 2009

(54) POSITIVE ELECTRODE ACTIVE MATERIAL FOR SECONDARY BATTERY, POSITIVE ELECTRODE FOR SECONDARY BATTERY, SECONDARY BATTERY AND METHOD FOR PRODUCING POSITIVE ELECTRODE ACTIVE MATERIAL FOR SECONDARY BATTERY

(75) Inventors: Tomokazu Kumeuchi, Tokyo (JP); Tatsuji Numata, Tokyo (JP); Daisuke Kawasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 709 days.

(21) Appl. No.: 10/522,594

(22) PCT Filed: May 26, 2004

(86) PCT No.: PCT/JP2004/007165

§ 371 (c)(1),
(2), (4) Date: Jan. 25, 2005

(87) PCT Pub. No.: WO2004/105162

PCT Pub. Date: Dec. 2, 2004

(65) Prior Publication Data

US 2006/0035151 A1 Feb. 16, 2006

(30) Foreign Application Priority Data

May 26, 2003 (JP) ............................ 2003-148261

(51) Int. Cl.
*H01M 4/58* (2006.01)
(52) U.S. Cl. ................. 429/231.1; 429/231.3; 429/224; 429/223; 429/338; 429/331
(58) Field of Classification Search ............. 429/231.1, 429/231.3, 224, 223, 338, 331
See application file for complete search history.

(56) References Cited

FOREIGN PATENT DOCUMENTS

| CN | 1484336 A | 3/2004 |
|---|---|---|
| JP | H05-036412 A | 2/1993 |
| JP | H06-187993 A | 7/1994 |
| JP | H10-092430 A | 4/1998 |
| JP | 2001-026424 A | 1/2001 |
| JP | 2001-163622 A | 6/2001 |
| JP | 2002-187722 A | 7/2002 |
| JP | 2002-279987 A | 9/2002 |
| JP | 2003-282055 A | 10/2003 |
| JP | 2004-139743 A | 5/2004 |

*Primary Examiner*—Laura S Weiner
(74) *Attorney, Agent, or Firm*—Sughrue Mion, PLLC

(57) ABSTRACT

A life of a secondary battery is extended, increase in a resistance when storing a secondary battery at an elevated temperature is prevented, and increase in a resistance during a charge-discharge cycle is prevented. A positive electrode active material comprising a lithium manganate and a lithium nickelate are used. The lithium manganate is a compound represented by the following formula (1) or the compound in which some of Mn or O sites are replaced with another element:

$$Li_{1+x}Mn_{2-x}O_4 \qquad (1)$$

(in the above-shown formula (1), $0.15 \leq x \leq 0.24$).

9 Claims, 2 Drawing Sheets

POSITIVE ELECTRODE ACTIVE MATERIAL FOR SECONDARY BATTERY, POSITIVE ELECTRODE FOR SECONDARY BATTERY, SECONDARY BATTERY AND METHOD FOR PRODUCING POSITIVE ELECTRODE ACTIVE MATERIAL FOR SECONDARY BATTERY

BACKGROUND OF THE INVENTION

1. Field of the Invention

The present invention relates to a positive electrode active material for a secondary battery, a positive electrode for a secondary battery, a secondary battery, and a process for manufacturing a positive electrode active material for a secondary battery.

2. Description of the Related Art

Ten years or more have passed from placing a first lithium ion secondary battery on the market. During the period, mobile devices have been rapidly improved and become widespread. Of course, properties of a lithium ion secondary battery, namely a higher output and a higher energy density, have contributed to such background. As a positive electrode active material for such a lithium ion secondary battery, $LiCoO_2$ has generally been used. $LiCoO_2$ gives a charge-discharge potential of 4 V class in a metal Li counter electrode. $LiCoO_2$ may be relatively easily prepared and give a capacity of about 150 to 160 mAh/g. Thus, it is convenient for constructing a high energy density battery. However, Co as a constituent element of $LiCoO_2$ is expensive. Furthermore, it is not necessarily suitable in terms of long-term reliability for applying it to a large battery for an HEV (hybrid electric vehicle) and the like assuming a longer period of 10 to 20 years.

In addition to requirements for a conventional battery such as good charge-discharge cycle properties at an elevated temperature and good capacity storage properties at an elevated temperature, an HEV application particularly requires prevention of increase of a battery resistance associated with cycles or storage and improved high-rate charge-discharge properties. Because of such situation, a novel positive electrode material in place of $LiCoO_2$ has been needed in a field requiring good high-rate properties and long-term reliability as in an HEV application, and strictly requiring cost reduction.

Recently, an $LiNiO_2$ material having a layered rock-salt structure and an $LiMn_2O_4$ having a spinel structure have been investigated in preparation for practical use as a small battery for a mobile device application. An $LiNiO_2$ material has a slightly lower operating voltage, but has a larger charge-discharge capacity of 170 to 200 mAh/g in comparison with $LiCoO_2$. Thus, it may be used to reduce a cost per a unit capacity. However, there are various restrictions for safely using an $LiNiO_2$ material. It has, therefore, not been regarded as the most promising candidate as a next positive electrode active material.

On the other hand, an Li-containing complex oxide represented by $LiMn_2O_4$ and having a cubic spinel structure exhibits good high-rate charge-discharge properties because of its crystal structure having three-dimensional Li diffusion paths, is quite safe owing to stability of $Mn^{4+}$, and is inexpensive. It is, therefore, promising as a positive electrode active material suitable to an HEV application.

However, compared to other layered oxides, $LiMn_2O_4$ exhibits larger variation of properties at a high temperature, leading to deterioration in a capacity associated with temperature rise in a charge-discharge cycle or storage.

It is believed that charge-discharge cycle properties in $LiMn_2O_4$ are inferior to those in $LiCoO_2$ generally because of Jahn-Teller distortion due to tervalent Mn ions and Mn elution from a lithium manganate crystal into an electrolytic solution. Thus, there has been investigated preparation of an Li-excess composition, that is, $Li_{1+x}Mn_{2-x}O_4$, or replacement of an Mn site with another element, particularly Cr (Patent documents 1 and 2).

These techniques basically approximate an Mn valence balance in a lithium manganate to tetravalence to strengthen an oxygen octahedron centering an Mn ion. Improvements in charge-discharge cycle properties using these techniques have been experimentally demonstrated. However, the extent of improvement by these techniques has been insufficient to meet a requirement for a power source for power storage or an electric automobile. Also, it has been insufficient from a viewpoint of a restriction of internal resistance variation shown in a battery premised on an HEV application, therefore, further improvement has been required.

Furthermore, a battery for the HEV application is required to have good high-rate charge-discharge properties, and thus to be of a low resistance and to show small variation in a resistance for a long period. Since investigation in this point of view has not conducted in conventional techniques, the extent of increase in a battery resistance during a long cycle or a long-term storage has not meet a requirement in an HEV or power storage application.

Patent document 1: Japanese Patent Laid-Open No. H6-187993;
Patent document 2: Japanese Patent Laid-Open No. H5-36412.

SUMMARY OF THE INVENTION

In view of the above situation, it is an object of the present invention to provide a technique for prolonging a life of a secondary battery. It is another object of the present invention to provide a technique for minimizing increase in a resistance when a secondary battery is stored at an elevated temperature. It is yet other object of the present invention to provide a technique for minimizing increase in a resistance in a charge-discharge cycle.

Inventors of the present invention have conducted intense investigation in an attempt to minimize a rate of resistance increase after using a secondary battery for a long period. As described above, a battery for an HEV application is particularly required to have good high-rate charge-discharge properties, and thus to be of a low resistance and to show small variation in a resistance for a long period. However, investigation in this point of view has not conducted. Thus, we have investigated a variety of factors, focusing variation in an internal resistance in a battery after using it for a certain period, and finally have achieved the present invention.

According to the present invention, there is provided a positive electrode active material for a secondary battery comprising a lithium manganate and a lithium nickelate, wherein the lithium manganate is a compound having a spinel structure represented by the following formula (1) or the compound in which some of Mn or O sites are replaced with another element:

$$Li_{1+x}Mn_{2-x}O_4 \qquad (1)$$

(in the formula (1) above, $0.15 \leq x \leq 0.24$).

In the present specification, "lithium manganate" includes a corresponding compound in which Mn or O sites are replaced with another element as long as it has a spinel structure similar to $LiMn_2O_4$. Also, in the present specification, "lithium nickelate" includes a corresponding compound in which Ni or O sites are replaced with another element as long as it has a layered rock-salt structure similar to $LiNiO_2$.

In the present invention, there is used the positive electrode active material comprising a lithium manganate and a lithium nickelate, wherein the lithium manganate is a compound having a spinel structure represented by the above-shown formula (1) or the compound in which some of Mn or O sites are replaced with another element. Thus, increase in a resistance when storing secondary battery at an elevated temperature can be suitably suppressed, and capacity reduction during long-term use can be suppressed.

As described above, the use of a lithium manganate having a spinel structure as a positive electrode active material for a secondary battery has been investigated, but no studies have been conducted in the light of minimizing increase in a resistance during long-term use. According to studies of the inventors, it has been demonstrated that factors, which would be effective for improving charge-discharge cycle properties of a lithium manganate, are not necessarily effective for minimization of variation in an internal resistance before and after storage.

Thus, we have scrutinized various experimental results, and have concluded that a positive electrode active material comprising a lithium manganate and a lithium nickelate having a large x value, in other words, lithium-rich compounds, as shown in the above-shown formula (1) can be used to consistently minimize increase in a resistance of a battery after storage at an elevated temperature.

Now then, since the compound represented by the above-shown formula (1) has a lithium-rich composition, it has been difficult to stably reproduce its quality by a conventional manufacturing process. We have, therefore, investigated its cause and have found the followings.

For preparation of a lithium manganate, an Mn source and an Li source are generally mixed in a molar ratio of Li/Mn=1/2 and the mixture is calcined at 700 to 800° C. to stably form a lithium manganate having a spinel structure. It has been, however, observed that when a rate of the Li source in the mixture is increased, a temperature of elimination of oxygen in the spinel is linearly reduced. A lithium-rich composition could not, therefore, calcined at a temperature in the above range.

When a calcination temperature is low, a battery comprising a lithium manganate as a positive electrode active material has lower stability during a long-term storage. It would be because a lower calcination temperature may lead to less crystallinity of a calcined product. Furthermore, it leads to increase of a BET specific surface area, resulting in increase in eluted manganese. Elution of manganese leads to elution of oxygen for compensating charge in the compound. Such oxygen elution may cause reduced stability during storage. In addition, precipitation of eluted manganese on a negative electrode sometimes causes deterioration in battery properties. Furthermore, calcination at a lower temperature leads to formation of a structure other than a spinel in the compound, remaining of the starting materials or formation of oxides thereof, resulting in reduction in a capacity.

Thus, it has been found that according to a conventional process, a lithium-excess composition cause deterioration in stability during long-term storage, since in a high-temperature calcination, a calcination temperature may be higher than the elimination temperature which leads to a elimination of oxygen, while in a low-temperature calcination, a temperature cannot be increased beyond the level, resulting in reduced crystallinity and increase in a specific surface area.

A secondary battery comprising a resulting lithium manganate as a positive electrode active material and lithium metal as a negative electrode is prepared, the battery is allowed to stand for one week or more at an elevated temperature of 40° C. or higher to obtain a discharge curve. Then, presence of a step around 3.3 V in the curve can be used as a measure of stability of a lithium manganate.

The step around 3.3 V in a discharge curve after storage at a higher temperature may be due to oxygen defects in a lithium manganate. Therefore, a step in a discharge curve for a resulting compound indicates presence of oxygen defects. Thus, a compound without the step around 3.3 V among those represented by the above-shown formula (1) can be selected as a lithium manganate, to further ensuring prevention of manganese elution.

According to the present invention, there is provided a process for manufacturing a positive electrode active material for a secondary battery as described above, comprising the step of: mixing an Mn source and an Li source to prepare a first mixture, which is then subjected to a first calcination at a temperature of no less than 800° C.; and mixing a first-calcination product obtained by the first calcination with the Li source to prepare a second mixture with a higher Li-source rate than the first mixture, and conducting a second calcination of the second mixture at a temperature of no less than 450° C. and lower than the first calcination to obtain the lithium manganate, wherein a $D_{50}$ particle size of the Li source is 2 μm or less.

In the present invention, a particle size of a lithium source is selected, two-step calcination is conducted, and a mixing ratio of starting materials and a calcination temperature in each calcination are adjusted to predetermined ranges. Thus, the lithium manganate having a spinel structure can be stably obtained even with a lithium-excess composition. In the manufacturing process according to the present invention, an Li source with a $D_{50}$ particle size of 0.5 μm to 2 μm both inclusive is used, so that reactivity between the Mn and the Li sources can be increased.

In the manufacturing process of the present invention, the Mn source and the Li source are not mixed in one step, but first a given amount of the Li source is mixed with the Mn source. A rate of the Li source in the resulting first mixture is lower than a rate of the Li source in a target lithium manganate, so that in the first calcination, calcination can be conducted at a relatively higher temperature. Thus, the spinel structure can be stably obtained. Then, the Li source is added to the resulting first calcination product to obtain the second mixture with an increased lithium rate in the starting materials to a composition of the target lithium manganate. The second mixture is enriched with lithium so that the second calcination is conducted at a temperature lower than that of the first calcination. Thus, oxygen elimination can be prevented by choosing certain mixing and calcination conditions.

The positive electrode active material comprising the lithium manganate thus obtained and the lithium nickelate can be used to consistently maintain battery stability during a long-term storage. No steps around 3.3 V were observed in a discharge curve after storing a battery manufactured using the lithium manganate obtained as a positive electrode active material at a high temperature.

According to the present invention, there is provided a positive electrode active material for a secondary battery comprising a lithium manganate and a lithium nickelate, wherein the lithium manganate is a particle compound having a spinel structure represented by the above-shown formula (1) or the compound in which some of Mn or O sites are replaced with another element; and an Mn elution amount when immersing the particles in a mixture comprising an electrolyte salt and a carbonate solvent is 1000 ppm or less as determined by inductive coupling plasma emission analysis.

In lithium manganate particles contained in the positive electrode active material for a secondary battery according to the present invention, the Mn elution amount required by ICP is 1000 ppm or less, so that formation of oxygen defects associated with manganese elution can be suitably prevented, and it can prevent eluted manganese from precipitating on a negative electrode. Thus, increase in a resistance of a battery can be consistently prevented during a long-term use.

The term, "Mn elution amount" as used in the present invention means the amount of manganese eluted during immersion of a substance to be measured in a concentration of 0.4 g/ml in a mixed solution at 80° C. for 10 days. The mixed solution comprises an electrolyte salt and a carbonate solvent. The carbonate solvent may be, for example, a mixture of a cyclic carbonate and a linear carbonate in a volume ratio of 30:70 to 50:50.

According to the present invention, there is provided a positive electrode active material for a secondary battery comprising a lithium manganate and a lithium nickelate, wherein the lithium manganate is a particle compound having a spinel structure represented by the above-shown formula (1) or the compound in which some of Mn or O sites are replaced with another element; and a specific surface area of the particles as determined by the BET method is 0.3 m²/g to 0.8 m²/g both inclusive.

In the lithium manganate particles contained in the positive electrode active material for a secondary battery according to the present invention, a specific surface area as determined by the BET method is 0.3 m²/g to 0.8 m²/g both inclusive. An area of 0.8 m²/g or less allows increase in the amount of eluted manganese to be suitably prevented, to provide the positive electrode active material for a secondary battery which can be suitably used. An area of 0.3 m²/g or more suitably ensures an area available to intercalate and disintercalate lithium ions, to provide the active material suitably used for high-rate charge-discharge.

In a positive electrode active material for a secondary battery of the present invention, the lithium nickelate may be a compound represented by the following formula (2) or the compound in which some of Co or O sites are replaced with another element:

$$LiNi_{1-y}Co_yO_2 \qquad (2)$$

(in the formula (2) above, $0.05 \leq y \leq 0.5$).

Thus, increase in a resistance and reduction in a capacity can be prevented when using a battery at an elevated temperature, and a capacity retention ratio can be improved during a long-term use.

In a positive electrode active material for a secondary battery of the present invention, the lithium nickelate may be a compound represented by the following formula (3):

$$LiNi_{1-\alpha-\beta}Co_\alpha M_\beta O_2 \qquad (3)$$

(in the formula (3) above, M comprises at least one of Al and Mn; $0.1 \leq \alpha \leq 0.47$; $0.03 \leq \beta \leq 0.4$; and $0.13 \leq \alpha+\beta \leq 0.5$).

Thus, increase in a resistance and reduction in a capacity can be further prevented when using a battery at an elevated temperature, and a capacity retention ratio can be further improved during a long-term use.

In a positive electrode active material for a secondary battery of the present invention, the lithium nickelate may be a compound represented by the following formula (4):

$$LiNi_{1-p-q}Co_p M_q O_2 \qquad (4)$$

(in the formula (4) above, M comprises at least one of Al and Mn; $0.1 \leq p \leq 0.5$; $0.03 \leq q \leq 0.5$; and $0.13 \leq p+q<1$).

In a positive electrode active material for a secondary battery of the present invention, when a weight ratio of the lithium manganate to the lithium nickelate is a: (100-a), "a" is in a range of $20 \leq a \leq 80$. Adjusting "a" to 80 or less, in other words, adjusting a rate of the lithium nickelate to 20 wt % or more, can further ensure minimization of increase in a resistance or reduction in a capacity during using a battery at a high temperature. Also, adjusting "a" to 20 or more, that is, adjusting a rate of the lithium nickelate to 80 wt % or less, can provide a battery with a longer life, and can ensure thermal stability of the battery.

According to the present invention, there is provided a positive electrode for a secondary battery wherein the positive electrode active material for a secondary battery as described above is bound via a binder. The positive electrode for a secondary battery of the present invention comprises the above positive electrode active material for a secondary battery, so that reduction in a battery capacity using a long-term use can be prevented, and increase in a resistance can be prevented when using a battery at a high temperature.

According to the present invention, there is provided a secondary battery comprising at least a positive electrode and a negative electrode, further comprising the positive electrode active material for a secondary battery as described above. The secondary battery of the present invention comprises the positive electrode active material for a secondary battery described above, so that increase in a resistance can be consistently prevented during storage at a high temperature or a charge-discharge cycle.

As described above, according to the present invention, a secondary battery with a longer life can be provided. Furthermore, according to the present invention, increase in a resistance when storing a secondary battery at a high temperature can be prevented. In addition, according to the present invention, increase in a resistance during a charge-discharge cycle can be prevented.

BRIEF DESCRIPTION OF THE DRAWINGS

The above and other objectives, features and advantages of the present invention will be more clearly understood with reference to the suitable embodiments below and the accompanying drawings.

PREFERRED EMBODIMENT OF THE INVENTION

Figure 1:
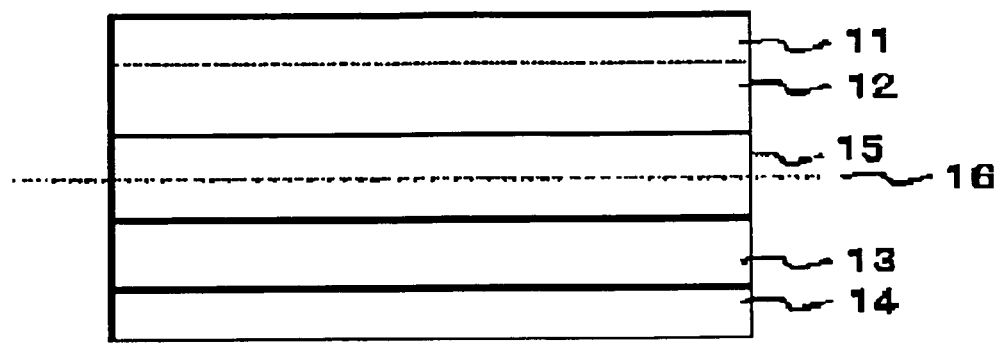
FIG. 1 shows a configuration of a secondary battery according to this embodiment.

There will be described a preferred embodiment of a secondary battery according to the present invention. A battery according to this embodiment may have, for example, a structure shown in FIG. 1. FIG. 1 is a schematic enlarged cross-section view of a secondary battery according to the present invention, the view being enlarged along a thickness direction of a negative electrode collector. A positive electrode is formed by depositing a layer 12 comprising a positive electrode active material on a positive electrode collector 11. A negative electrode is formed by depositing a layer 13 comprising a negative electrode active material on a negative electrode collector 14. The positive electrode and the negative electrode face each other via an electrolytic solution 15 and a porous separator 16 in the electrolytic solution 15. The porous separator 16 is placed in generally parallel with the layer 13 comprising a negative electrode active material.

A positive electrode active material used in a layer 12 comprising a positive electrode active material is selected from Li-containing complex oxides having an average discharge potential of about 4 V to Li metal. Particularly, a positive electrode active material comprising a lithium manganate and a lithium nickelate can be suitably used.

The lithium manganate can be suitably a compound having a spinel structure represented by the following formula (1):

$$Li_{1+x}Mn_{2-x}O_4 \tag{1}$$

(in the above-shown formula (1), $0.15 \leq x \leq 0.24$). In the compound having the spinel structure represented by the above-shown formula (1), some of Mn or O sites may be replaced with another element. For example, depending on a priority of targeted battery properties, manganese sites may be further replaced with another cation as appropriate. Examples of another cation include those of Mg, Al, Ca, Sc, Ti, V, Cr, Fe, Co, Ni, Zn, Sr, Y, Zr, Nb, In, Sn, La, Ce, Nd, Sm, Gd, Ta, Bi and Pb. Alternatively, oxygen sites may be replaced with anther anion, for example, those of F and Cl.

A positive electrode active material comprising a compound represented by the above-shown formula (1) and a lithium nickelate can be used to prevent increase in a battery resistance during a long-term use.

When a mixing ratio of the lithium manganate having a spinel structure represented by the above-shown formula (1) and the lithium nickelate is expressed as a: (100-a) by weight, "a" may be, for example, 20 or higher. Thus, a battery with a longer life can be provided, and thermal stability of the battery can be suitably ensured. And, for example, "a" may be 80 or less. Thus, increase in a resistance or reduction in a capacity when using a battery at a high temperature can be more consistently prevented.

The lithium nickelate may be suitably a compound represented by the following formula (2):

$$LiNi_{1-y}Co_yO_2 \tag{2}$$

(in the above-shown formula (2), $0.05 \leq y \leq 0.5$).

In the compound represented by the above-shown formula (2), some of Co or O sites may be replaced with another element.

Selecting the compound represented by formula (2) as the lithium nickelate can effectively prevent increase in a battery resistance. The compound represented by the above-shown formula (2) can be prepared by a known process used as a preparation process for a lithium nickelate. For example, an Li source and an Ni source are mixed and the mixture is calcined at a given temperature to prepare the compound. A compound in which Ni sites are replaced can be prepared by using, for example, an Ni source in which Ni sites are replaced.

Also, the lithium nickelate may be suitably a compound represented by the following formula (3):

$$LiNi_{1-\alpha-\beta}Co_\alpha M_\beta O_2 \tag{3}$$

(in the above-shown formula (3), M comprises at least one of Al and Mn; $0.1 \leq \alpha \leq 0.47$; $0.03 \leq \beta \leq 0.4$; and $0.13 \leq \alpha+\beta \leq 0.5$).

The compound represented by the above-shown formula (3) can be used to further effectively prevent increase in a battery resistance.

Alternatively, the lithium nickelate may be a compound represented by the following formula (4):

$$LiNi_{1-p-q}Co_p M_q O_2 \tag{4}$$

(in the above-shown formula (4), M comprises at least one of Al and Mn; $0.1 \leq p \leq 0.5$; $0.03 \leq q \leq 0.5$; and $0.13 \leq p+q<1$).

The compound represented by the above-shown formula (4) may be, for example, $LiNi_{0.34}Co_{0.33}Mn_{0.33}O_2$. Such a compound can be used to suitably prevent increase in a battery resistance.

A positive electrode active material particle may have any shape including, but not particularly limited to, an agglomerate, a sphere and a plate, and its size may be appropriately selected, taking a positive electrode film thickness and a electrode density of the positive electrode into account. For the lithium manganate, it is desirable to select a particle shape, a size distribution, an average size, a specific surface area and a true density or the like, such that at least one of (i) and (ii) described below is met. For a combination of the positive electrode composition comprising a positive electrode active material, a binder and a conductive agent and so on, a particle shape, a size distribution, an average size, a specific surface area and a true density are desirably selected such that the a weight rate of the positive electrode active material is 80% or more.

The lithium manganate contained in the positive electrode active material can be selected to meet the following conditions:

(i) an eluted Mn amount when immersing it in a concentration of 0.4 g/mL in a mixed solution at 80° C. for 10 days is 1000 ppm or less, preferably 700 ppm or less, or (ii) a specific surface area as determined by the BET method is 0.3 m²/g to 0.8 m²/g both inclusive. It can be used to suitably prevent increase in an internal resistance or reduction in a capacity retention ratio during a long-term use, and further to prevent increase in an internal resistance of a battery during the use at a high temperature.

In (i), the mixed solution comprises a carbonate solvent and a supporting salt. The carbonate solvent is, for example, a mixture of a cyclic carbonate and a linear carbonate in a volume ratio of 30:70 to 50:50. Specifically, it is, for example, a mixture of EC/DEC=30/70 (by volume). As a supporting salt, for example, $LiPF_6$ is contained in a concentration of 1 mol/L.

Next, there will be described preparation of the lithium manganate represented by the above-shown formula (1). An Li source, one of starting materials for the preparation, can be, for example, $Li_2CO_3$, LiOH, $Li_2O$ and $Li_2SO_4$. An Mn source can be, for example, $MnO_2$, $Mn_2O_3$, $Mn_3O_4$, MnOOH, $MnCO_3$ and $Mn(NO_3)_2$. Among these, particularly preferred are $Li_2CO_3$ as the Li source and $MnO_2$, $Mn_2O_3$ or $Mn_3O_4$ as the Mn source in the light of a cost, handleability and easier preparation of an active material with a higher packing density.

Hereinafter, there will be described a preparation method. The above starting materials appropriately selected are weighed and blended such that a given metal composition can be obtained. Blending is conducted by a machine selected from a ball mill, a V-type blender, a cutter mixer and a shaker and the like, and the machine can be appropriately selected. The resulting mixture powder is calcined in an atmosphere containing oxygen in a larger amount than that in the air at a temperature within a range of about 450 to 950° C.

However, it is difficult to obtain a positive electrode active material meeting at least one of the above-shown conditions (i) and (ii) according to the conventional method described above. As described above, for preparing a lithium manganate having a lithium-rich composition, it is necessary to sufficiently ensure reactivity between the Mn source and the Li source. Furthermore, the calcination conditions must be determined, taking a temperature of oxygen elimination into account. So, in this embodiment, the Li source material having a particle size $D_{50}$ of, for example, 2 µm or less can be selected and used. Using the Li source with $D_{50}$ of not less than 2 µm can improve reactivity with the Mn source, and can improve crystallinity of a lithium manganate prepared. Also, the Li source can have $D_{50}$ of, for example, 0.1 µm or more while the Mn source preferably has $D_{50}$ of 30 µm or less, to improve reactivity between the Li source and the Mn source.

Furthermore, calcination is conducted in two steps by choosing calcination conditions depending on materials selected. In the first calcination, calcination is conducted with the excessive amount of lithium, namely "x" in the above-shown formula (1), of, for example, about 0.000 to 0.013 and is conducted at high temperature. Then, in the second calcination, the Li source is further added for a Li-excess composition so that a target compound has a desired "x" in the above-shown formula (1), and calcination is conducted at low temperature. Thus, the positive electrode active material meeting at least one condition of (i) and (ii) can be prepared. Meeting both (i) and (ii) is more preferable. Among compounds represented by the above-shown formula (1), the lithium manganate meeting at least one condition of (i) and (ii) can be used to further improve battery stability during a long-term use, and to further prevent increase a battery resistance during the use at a high temperature.

Selection of starting materials and calcination conditions in preparation of a positive electrode active material according to this embodiment will be further detailed in Examples below, comparing with a conventional manufacturing process. A secondary battery comprising a resulting lithium manganate as a positive electrode active material and lithium metal as a negative electrode is prepared, the battery is allowed to stand for one week or more at an elevated temperature of 40° C. or higher to obtain a discharge curve. Then, presence of a step around 3.3 V in the curve can be used as a measure of stability of the lithium manganate. The lithium manganate represented by the above-shown formula (1) which meets at least one condition of (i) and (ii) does not have the step around 3.3 V, so that it can suitably ensure stability of the lithium manganate and thus can be used as the positive electrode active material.

Next, there will be described a process for preparing the lithium nickelate used in this embodiment, with reference to an exemplary compound in which nickel is partly replaced with cobalt or aluminum. As starting materials, an Li source can be selected from $Li_2CO_3$, LiOH, $Li_2O$ and $Li_2SO_4$ and an Ni—Co material may be selected from hydroxides, carbonates and oxides. An Al material for replacing Ni with Al can be selected from $Al_2O_3$, $Al(OH)_3$, aluminum nitrate and aluminum acetate. An Ni—Co—Al complex hydroxide, an Ni—Co—Al complex carbonate or an Ni—Co—Al complex oxide prepared to contain Al in a given rate may be used.

Among these, particularly preferred are $Li_2CO_3$ as the Li source, a hydroxide as the Ni—Co material and $Al_2O_3$ or Al$(OH)_3$ as the Al material. Further preferably, an Ni—Co—Al complex oxide is used.

The above starting materials appropriately selected are weighed and blended in a composition ratio whereby desired "y" in the above-shown formula (2) or "α" and "β" in the above-shown formula (3) can be obtained. The resulting mixture is calcined in the air or in oxygen at a temperature within a range of, for example, about 600° C. to 950° C., preferably about 700° C. to 850° C. Thus, the lithium nickelate having a layered rock-salt structure can be consistently obtained.

A BET specific surface area of the lithium nickelate thus obtained is preferably 0.3 $m^2/g$ or more. Thus, Mn elution from the lithium manganate can be prevented. In addition, a BET specific surface area of the lithium nickelate is preferably 2 $m^2/g$ or less, more preferably 1 $m^2/g$ or less. Thus, the amount of a binder added can be reduced, to improve an energy density of a battery, to improve thermal stability, and to prevent a slurry from gelling during forming an electrode.

The lithium manganate and the lithium nickelate thus obtained are mechanically blended. A weight rate of the lithium nickelate is preferably 20% to 80% both inclusive. With a rate of 20% or higher, increase in a battery resistance can be consistently prevented while with a rate of 80% or less, reduction in thermal stability can be prevented.

The mixture thus prepared is mixed with the binder and the conductive agent to form an electrode. The binder can be a commonly used resin binder depending on properties important in a battery such as rate properties, low-temperature discharge properties, pulse discharge properties, an energy density, weight reduction and size reduction, and so on; polyvinylidene fluoride (PVdF) and polytetrafluoroethylene (PTFE) or the like. The conductive agent can be, for example, acetylene black and carbon. A collector metal foil is preferably Al foil.

A negative electrode active material used in a layer 13 comprising a negative electrode active material is preferably selected from Li metal, Li alloys and carbon materials and so on, which is capable of intercalating and disintercalating Li ions, or metals which can form an alloy with Li, metal oxides, or complex materials of a carbon material therewith and transition metal nitrides. In the light of improvement in high rate properties and output properties, it is preferably amorphous carbon. Additionally, when using amorphous carbon, preferably d002 obtainable from X-ray diffraction is about 0.38 nm and a true density is about 1.5 to 2.0 g/ml.

The negative electrode active material is mixed with binder species to form an electrode. The binder can be appropriately selected, depending on important properties required for a battery. Examples include the materials as a binder for a positive electrode, namely polyvinylidene fluoride (PVdF) and polytetrafluoroethylene (PTFE), and rubber binders. The negative electrode collector 14 is preferably Cu foil.

A solvent used in the electrolytic solution 15 can be appropriately selected from those commonly used as non-proton solvent; for example, cyclic carbonates, linear carbonates, aliphatic carboxylates, chlorohydrocarbons, cyclic ethers, linear ethers, ketones and nitrites. More specifically, preferred is a mixture of at least one high-permittivity solvent selected from ethylene carbonate (EC), propylene carbonate (PC) and γ-butyrolactone (GBL) or the like and at least one low viscosity solvent selected from diethyl carbonate (DEC), dimethyl carbonate (DMC), ethyl methyl carbonate (EMC) and esters or the like. Preferable examples of such a mixed solution include EC/DEC, PC/DMC, PC/EMD and PC/EC/DEC. When a solvent has a low purity or has a large moisture content, a mixing rate of a solvent with a potential window broader in a high potential side is preferred to be increased. Furthermore, in order to improve water consumption or acid resistance or improve safety, a trace amount of an additive may be added.

A supporting salt in the electrolytic solution 15 can be at least one selected from, for example, $LiBF_4$, $LiPF_6$, $LiClO_4$, $LiAsF_6$, $LiSbF_6$, $LiCF_3SO_3$, $Li(CF_3SO_2)N$, $LiC_4F_9SO_3$, $Li(CF_3SO_2)_3C$ and $Li(C_2F_5SO_2)_2N$ and the like. Particularly, a LiPF$_6$-containing system is preferable. Using LiPF$_6$ can increase an electric conductivity of the lithium salt and further improve cycle properties of a secondary battery. A concentration of the supporting salt in the electrolytic solution 15 can be, for example, 0.8 M to 1.5 M, preferably 0.9 M to 1.2 M.

The porous separator 16 may be selected from, but not limited to, fabrics, glass fibers and porous synthetic resin films and so on; for example, porous films including polyolefins such as polypropylene and polyethylene and fluororesins and the like. These films are preferred in the light of its thinness and availability in a large area application, film strength and film resistance.

The secondary battery in FIG. 1 can be manufactured by stacking the negative electrode and the positive electrode via the porous separator 16 in the dry air or in an inert gas atmosphere or rolling such a stack; placing it in a battery can or an outer package of a flexible film as a laminate of a synthetic resin and a metal foil or the like; impregnating it with the electrolytic solution 15; and then sealing the outer package.

There are no restrictions to a shape of the secondary battery according to this embodiment. For example, a variety of shapes may be used, including a square, a paper, a stack, a cylinder, a coin or a laminate outer package. There are no restrictions to an outer package material or other constructional elements, but it can be selected depending on a battery shape.

A positive electrode active material and a secondary battery prepared by this embodiment can be suitably used particularly in an HEV application. Also, a secondary battery having such excellent properties not only can be applied to, for example, load leveling and a backup system, but also can provide batteries for various mobile device with higher performance and can significantly contribute to construction of a clean energy society.

The present invention has been described with reference to the embodiments. It will be appreciated by the skilled in the art that these embodiments are only illustrative and that many variations may be possible in a combination of the constituents and the handling processes and these variations are within the scope of the present invention.

Hereinafter, the present invention will be more specifically described with reference to, but not limited to, Examples.

EXAMPLES

Preparation of Li$_{1+x}$Mn$_{2-x}$O$_4$

First, the conditions for preparing a lithium manganate used as a positive electrode active material have been investigated. In this example, a lithium manganate used was Li$_{1+x}$Mn$_{2-x}$O$_4$ represented by the above-shown formula (1). Table 1 shows Li amounts "x" in the prepared lithium manganates, D$_{50}$ particle sizes of Li$_2$CO$_3$ and Mn sources. These lithium manganates were prepared as follows. In this example, six lithium manganates were prepared. In Table 1, these are identified by "lithium manganate IDs", A-1 to A-6.

An Li source was Li$_2$CO$_3$ and the Mn source was EMD (electrolytic manganese dioxide) or Mn$_2$O$_3$. First, for improving reactivity and preparing Li$_{1+x}$Mn$_{2-x}$O$_4$ having an intended particle size, Li$_2$CO$_3$ was pulverized and EMD was pulverized and classified. Considering that an average particle size of Li$_{1+x}$Mn$_{2-x}$O$_4$ is preferably about 5 to 30 μm in the light of a combination of ensuring homogeneity of a charge-discharge reaction, facility in slurry preparation and safety, a particle size of EMD was adjusted to be within the same range of 5 to 30 μm. Meanwhile, Li$_2$CO$_3$ was subjected to pulverization and classification for adjusting its particle size such that a D$_{50}$ particle size comes to be 2 μm or 10 μm.

These starting materials were mixed such that a given Li/Mn ratio was obtained. The mixed powder was calcined under a dry air flow or in an oxygen atmosphere, under the conditions shown in Table 1. For a sample subjected to two-step calcination, the materials were mixed such that a molar ratio of Li/Mn was 1.0/2.0, and the mixture was calcined at 850° C. under a dry air flow or in an oxygen atmosphere. After adding Li$_2$CO$_3$ to obtain a desired Li/Mn ratio, the mixed powder obtained was subjected to a second calcination in the same atmosphere.

Fine particles of obtained Li$_{1+x}$Mn$_{2-x}$O$_4$ with a size of 1 μm or less were removed by an air classifier. The resulting Li$_{1+x}$Mn$_{2-x}$O$_4$ had an average particle size of 12 to 18 μm, an average particle size D$_{50}$ of 30 μm or less and a true density of 3.98 to 4.15 g/ml.

TABLE 1

| Lithium manganate ID | D$_{50}$ of Li$_2$CO$_3$ (pro) | Mn source | First calcination temperature (° C.) | Second calcination temperature (° C.) | "x" in Li$_{1+x}$Mn$_{2-x}$O$_4$ |
|---|---|---|---|---|---|
| A-1 | 2 μm | EMD | 850 | 700 | 0.1 |
| A-2 | 2 μm | EMD | 600 |  | 0.13 |
| A-3 | 2 μm | EMD | 850 | 600 | 0.15 |
| A-4 | 2 μm | EMD | 850 | 500 | 0.24 |
| A-5 | 10 μm | EMD | 850 | 600 | 0.15 |
| A-6 | 10 μm | Mn$_2$O$_3$ | 850 | 600 | 0.15 |

Evaluation of Li$_{1+x}$Mn$_{2-x}$O$_4$

For each Li$_{1+x}$Mn$_{2-x}$O$_4$, an amount of eluted Mn and a BET specific surface area were determined. Furthermore, these lithium manganates were used to prepare 2320 type coin cells, which were subjected to determination of a capacity recovery rate after storage at a high temperature and were evaluated for the presence of a step around 3.3 V in a discharge curve. First, individual evaluation procedures will be described and then evaluation results will be shown.

Determination of Eluted Mn Amount

Two grams of each lithium manganate powder shown in Table 1 was immersed in 5 mL of an electrolytic solution and stored at 80° C. for 10 days. The amount of Mn eluted into the electrolytic solution after storage was determined by ICP (inductive coupling plasma emission analysis). A solvent used for the electrolytic solution was EC/DEC=30/70 (by volume) and a supporting salt used for the electrolytic solution was LiPF$_6$. A concentration of LiPF$_6$ in the electrolytic solution was 1 mol/L.

Determination of Specific Surface Area by the BET Method

A BET specific surface area of a lithium manganate was determined in accordance with JIS Z 8830, using a multifunctional automatic surface area measuring apparatus (Quanta-Sorb-QS-18: manufactured by QUANTA CHROME Corporation.).

Preparation of 2320 Type Coin Cells and Determination of Capacity Recovery Rate

The lithium manganate and a conductive agent were dry-blended and the mixture was homogeneously dispersed in N-methyl-2-pyrrolidone (NMP) containing PVdF as a binder to prepare a slurry. The slurry was applied on an aluminum metal foil with a thickness of 20 μm, and NMP was evaporated to prepare a positive electrode sheet.

A solid ratio in the positive electrode was lithium manganate:conductive agent:PVdF=89:7:4 by weight. This positive electrode sheet was stamped out into a positive electrode with a diameter of 12 mmφ. Lithium metal with a diameter of 14 mmφ was used for a negative electrode. The positive electrode and the negative electrode were stacked via a porous polypropylene film separator with a thickness of 25 μm to prepare a 2320 type coin cell. In the electrolytic solution, a supporting salt was 1 mol/L LiPF$_6$ and a solvent was a mixture of EC and DEC in a ratio of EC:DEC=30:70 by volume.

The 2320 type coin cell was evaluated for its capacity retention properties. First, a discharge capacity was determined by charging at a current of 0.1 mA/cm$^2$ to 4.3 V and then discharging at the same current to 3.0 V. Again, after charging at a current of 0.1 mA/cm$^2$ to 4.3 V, the battery was discharged to DOD (Depth of discharge) 80% with which capacity-lowering rate, characteristic in a lithium manganate, is large. The battery was allowed to be placed in a thermostatic oven at 60° C. for 2 weeks. After that, the battery was discharged to 3.0 V, recharged at 0.1 mA/cm$^2$ to 4.3 V and then determined for a discharge capacity to 3.0 V. It was evaluated for a capacity recovery rate that is a ratio of a discharge capacity after storage against an initial discharge capacity, and the presence of the step around 3.3 V in a discharge curve. Here, a capacity recovery rate was calculated as follows:

Capacity recovery rate=(Discharge capacity after storage)/(Initial discharge capacity)×100.

Evaluation Results

The evaluation results are shown in Table 2. Also, FIG. 2 shows discharge curves for batteries prepared using lithium manganates of A-1, A-3 and A-4 as examples of discharge curves after storage of the 2320 type coin cells.

The results in Table 2 indicate the followings. Comparing the lithium manganates of A-1, A-3 and A-4, all of these have a D$_{50}$ for Li$_2$CO$_3$ of 2 μm, and although a two-step calcination was conducted, a capacity recovery rate is low, a BET specific surface area is large and an eluted Mn amount is large when "x" in the formula Li$_{1+x}$Mn$_{2-x}$O$_4$ is 0.10.

Figure 2:
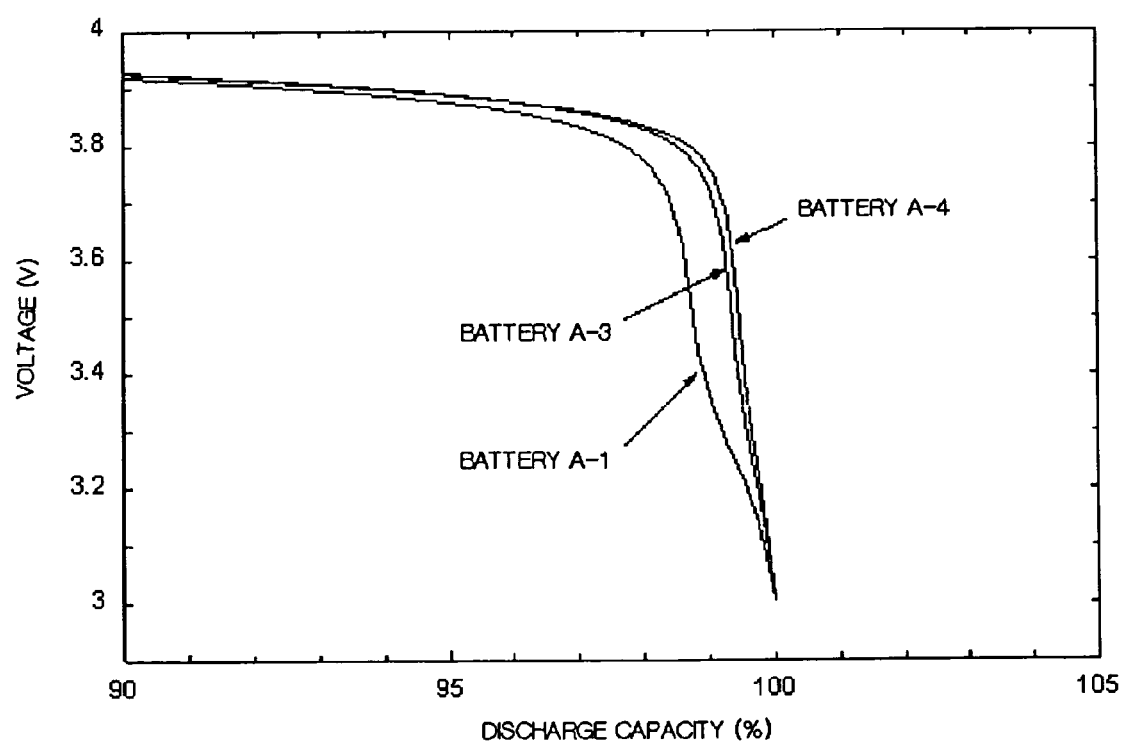
FIG. 2 is a discharge curve of a battery comprising a lithium manganate as a positive electrode active material in evaluation of the lithium manganates in Examples.

As shown in FIG. 2, when "x" in the above-shown formula (1) is 0.10, the step around 3.3 V appears in a discharge curve after storing a secondary battery comprising the above battery as a positive electrode active material at an elevated temperature.

In the battery comprising the lithium manganate of A-2 as a positive electrode active material prepared by one-step calcination at a lower temperature for preventing oxygen elimination in which x=0.13, a capacity recovery rate is lower and the step around 3.3 V appears, and further, a BET specific surface area and an eluted Mn amount are also larger.

Next, comparing A-3, A-5 and A-6 having different average particle sizes D$_{50}$ for Li$_2$CO$_3$ and the same Li/Mn ratio of x=0.15, the battery of A-3 with a D$_{50}$ for Li$_2$CO$_3$ of 2 μm shows a higher capacity recovery rate than that of A-5 or A-6 with a D$_{50}$ for Li$_2$CO$_3$ of 10 μm, and generates no steps around 3.3 V. Furthermore, a BET specific surface area and an eluted Mn amount are lower.

These results indicate that a lithium manganate in which "x" in the formula Li$_{1+x}$Mn$_{2-x}$O$_4$ meets 0.15≦x≦0.24 and which is prepared using Li$_2$CO$_3$ with a D$_{50}$ of 2 μm or less by two-step calcination, exhibits a higher capacity recovery rate after storage in an atmosphere at an elevated temperature of 60° C. Furthermore, an eluted Mn amount and a BET specific surface area are lower. With such a lithium manganate, a battery discharge curve has no steps around 3.3 V.

Although the reason for these is not clear, it would be correlated with the necessity of controlling powder properties by a manufacturing process and ensuring reactivity with an Li source for providing a lithium manganate with good high-temperature properties. It would be, therefore, needed to reduce a particle size of Li$_2$CO$_3$. A factor most influential to high-temperature properties is an Li/Mn ratio, and the range of "x" in the above-shown formula (1) can be adjusted to 0.15≦x≦0.24 to provide a lithium manganate with good high-temperature properties. Among lithium manganates meeting the condition of 0.15≦x≦0.24, a material with a Li$_2$CO$_3$ size of 2 μm or less is chosen and two-step calcination is conducted, so that an eluted Mn amount can be further reduced.

Preparation of Lithium Nickelates

In this embodiment, a compound represented by the above-shown formula (2) or (3) was used as a lithium nickelate. These compounds were prepared as follows.

TABLE 2

| Lithium manganate ID | "x" in Li$_{1+x}$Mn$_{2-x}$O$_4$ | Capacity recovery rate (%) | Step around 3.3 V | Amount of eluted Mn (ppm) | Specific surface area by BET (m$^2$/g) |
|---|---|---|---|---|---|
| A-1 | 0.1 | 89.5 | Existence | 1200 | 0.85 |
| A-2 | 0.13 | 87.5 | Existence | 1830 | 1.24 |
| A-3 | 0.15 | 93.3 | Nonexistence | 530 | 0.68 |
| A-4 | 0.24 | 94.6 | Nonexistence | 480 | 0.62 |
| A-5 | 0.15 | 89.5 | Existence | 860 | 0.72 |
| A-6 | 0.15 | 88.6 | Existence | 930 | 0.80 |

Preparation of LiNi$_{1-y}$Co$_y$O$_2$

For preparing LiNi$_{1-y}$Co$_y$O$_2$ represented by the above-shown formula (2), starting materials were Li$_2$CO$_3$ and ($Ni_{0.8}Co_{0.2}$) hydroxide in which 20% of nickel was replaced with cobalt. These starting materials were blended in a molar ratio of [Li]/[$Ni_{0.8}CO_{0.2}$]=1/1. The resulting mixed powder was calcined at 750° C. in the air. A specific surface area was 0.6 $m^2/g$.

Preparation of $LiNi_1-\alpha-\beta Co_\alpha M_\beta O_2$

In this embodiment, M in $LiNi_1-\alpha-\beta Co_\alpha M_\beta O_2$ represented by the above-shown formula (3) was Al. As starting materials, $Li_2CO_3$ and ($Ni_{0.8}CO_{0.15}Al_{0.05}$) hydroxide in which 15% and 5% of nickel were respectively replaced with cobalt and aluminum were used. These starting materials were blended in a molar ratio of [Li]/[$Ni_{0.8}CO_{0.15}Al_{0.05}$]=1/1. The resulting mixed powder was calcined at 750° C. in the air. A specific surface area was 0.6 $m^2/g$.

Preparation of 18650 Type Cylindrical Cells

In this embodiment, lithium manganates of A1 to A6 were used to prepare 18650 type cylindrical cells. Table 3 shows the batteries prepared in this embodiment.

$LiNi_{0.8}CO_{0.2}O_2$ was added to the lithium manganates of A1 to A6 as a positive electrode active material to 30% by weight. Each of these positive electrode active material was dry-blended with a conductive agent, and homogeneously dispersed in N-methyl-2-pyrrolidone (NMP) containing PVdF as a binder to prepare a slurry. These slurries were applied on aluminum metal foils with a thickness of 20 μm, respectively, and NMP was evaporated to prepare positive electrode sheets using each positive electrode active material. A solid ratio in the positive electrode was (lithium manganate+lithium nickelate):conductive agent:PVdF=89:7:4 by weight.

Amorphous carbon was used as a negative electrode active material, and was homogeneously dispersed in NMP containing PVdF as a binder to prepare a slurry. The slurry was applied on a copper foil with a thickness of 15 μm and NMP was evaporated to prepare a negative electrode sheet. A solid ratio in the negative electrode was amorphous carbon: PVdF=90:10 by weight.

The negative electrode sheet and the positive electrode sheet thus prepared were wound via a porous polyethylene film separator with a thickness of 25 μm to form a cylindrical battery with a diameter of 18 mm and a height of 65 mm. In the electrolytic solution, a supporting salt was 1 mol/L $LiPF_6$ and a solvent was a mixture of ethylene carbonate (EC): diethyl carbonate (DEC)=30:70 (by volume). The battery IDs B-1 to B-6 correspond to 18650 type cylindrical cells comprising A1 to A6 as a lithium manganate in a positive electrode active material, respectively.

Using the lithium manganate of A-3 mixed 30 wt % of $LiNi_{0.8}Cu_{0.15}Al_{0.05}O_2$ as a positive electrode active material, a 18650 type cylindrical cell was prepared as described above. The battery thus obtained is identified by a battery ID, C-3.

In addition, using the lithium manganate of A-3 and $LiNi_{0.8}CO_{0.2}O_2$ as a positive electrode active material, 18650 type cylindrical cells containing 10 to 90 wt %, increased by 10 wt %, of a lithium nickelate were prepared as described above. The batteries thus obtained were identified by "D-3-(a content of $LiNi_{0.8}CO_{0.2}O_2$ (wt %))", that is, D-3-10 to D-3-90. The battery comprising a lithium nickelate in 30 wt %, D-3-30, is identical to the battery B-3 described above.

Additionally, a 18650 type cylindrical cell was prepared as described above, except using a positive electrode sheet comprising the lithium manganate of A-3 mixed 30 wt % of $LiNi_{0.8}Co_{0.2}O_2$ as a positive electrode active material, and graphite as a negative electrode. The battery is identified by E-3.

Evaluation

Each battery in Table 3 was evaluated for a rated capacity and an initial and a post-storage internal resistances.

Determination of Rated Capacity

First, each battery prepared was charged at 1000 mA to 4.2 V and then at the constant voltage for 1.5 hours. Then, it was discharged at a constant current of 100 mA to 2.5 V, at the end of which a capacity was determined and the value was defined as a rated capacity for each battery. Then, the battery was aged by charging it under the same conditions, allowing it to stand at 25° C. for one week and then discharged it at 100 mA to 2.5 V.

Determination of Initial Internal Direct Current Resistance

Each battery after the above sequential processing was charged under the same conditions. The battery after charging was discharged at 0.2 C for each battery (a current for completing discharge of a rated capacity in 5 hours, 200 mA for 1000 mA) to a depth of discharge (DOD) of 50%, and then at 1C for 10 sec, at the end of which a voltage was determined. After leaving it for 10 min, it was charged at a 1C rate current

TABLE 3

| Battery ID | Lithium manganate ID | "x" in $Li_{1+x}Mn_{2-x}O_4$ | Lithium nickelate | Content of lithium nickelate (wt %) | Negative electrode |
|---|---|---|---|---|---|
| B-1 | A-1 | 0.1 | $LiNi_{0.8}Co_{0.2}O_2$ | 30 | Amorphous carbon |
| B-2 | A-2 | 0.13 | $LiNi_{0.8}Co_{0.2}O_2$ | 30 | Amorphous carbon |
| B-3(D-3-30) | A-3 | 0.15 | $LiNi_{0.8}Co_{0.2}O_2$ | 30 | Amorphous carbon |
| B-4 | A-4 | 0.24 | $LiNi_{0.8}Co_{0.2}O_2$ | 30 | Amorphous carbon |
| B-5 | A-5 | 0.15 | $LiNi_{0.8}Co_{0.2}O_2$ | 30 | Amorphous carbon |
| B-6 | A-6 | 0.15 | $LiNi_{0.8}Co_{0.2}O_2$ | 30 | Amorphous carbon |
| C-3 | A-3 | 0.15 | $LiNi_{0.8}Co_{0.15}Al_{0.05}O_2$ | 30 | Amorphous carbon |
| D-3-10 | A-3 | 0.15 | $LiNi_{0.8}Co_{0.2}O_2$ | 10 | Amorphous carbon |
| D-3-20 | A-3 | 0.15 | $LiNi_{0.8}Co_{0.2}O_2$ | 20 | Amorphous carbon |
| D-3-40 | A-3 | 0.15 | $LiNi_{0.8}Co_{0.2}O_2$ | 40 | Amorphous carbon |
| D-3-50 | A-3 | 0.15 | $LiNi_{0.8}Co_{0.2}O_2$ | 50 | Amorphous carbon |
| D-3-60 | A-3 | 0.15 | $LiNi_{0.8}Co_{0.2}O_2$ | 60 | Amorphous carbon |
| D-3-70 | A-3 | 0.15 | $LiNi_{0.8}Co_{0.2}O_2$ | 70 | Amorphous carbon |
| D-3-80 | A-3 | 0.15 | $LiNi_{0.8}Co_{0.2}O_2$ | 80 | Amorphous carbon |
| D-3-90 | A-3 | 0.15 | $LiNi_{0.8}Co_{0.2}O_2$ | 90 | Amorphous carbon |
| E-3 | A-3 | 0.15 | $LiNi_{0.8}Co_{0.2}O_2$ | 30 | Graphite | for 10 sec, at the end of which a voltage was determined. After leaving it for further 10 min, it was discharged at 3C for 10 sec, at the end of which a voltage was determined. Again, after leaving it for 10 min, it was charged at 3C for 10 sec, at the end of which a voltage was determined. Subsequently, with a standing period of 10 min, similar measurement was repeated with charge-discharge rates of 5C and 7C to obtain a V-I line, whose slope was defined as an initial internal DC resistance.

Post-Storage Internal Direct Current Resistance

Each battery after determining an initial internal direct current resistance was adjusted to the state of DOD 50% at a current corresponding to 0.2C for each battery, and then stored in a thermostatic oven at 55° C. for four weeks. Then, it was discharged at a constant current of 100 mA to 2.5 V, charged at 1000 mA to 4.2 V, and then charged at the constant current for 1.5 hours. Subsequently, it was discharged at a constant current of 100 mA to 2.5 V, at which a capacity was defined as a recovery capacity for each battery. Then, a capacity recovery rate was calculated by the following equation.

Capacity recovery rate (%)=Recovery capacity/Rated capacity×100

The calculated capacity recovery rates are shown in Table 4.

Furthermore, a V-I line was obtained as described for determination of the initial internal direct current resistance, and its slope was defined as a post-storage internal direct current resistance, that is, Resistance increase factor=(Post-storage internal direct current resistance)/(Initial internal direct current resistance).

The calculation results are shown in Table 4.

Determination of Capacity Retention Ratio After 300 Cycles Test

The 18650 type cylindrical cells in Table 3 were evaluated by a charge-discharge cycle test at 55° C. The charge-discharge cycle test was conducted by repeating the operation of charging at a constant 1C current of a rated capacity to 4.2 V, charging it at a constant voltage for 1.5 hours and discharging it at a constant 1C current of the rated capacity to 2.5 V. After 300 cycles, a capacity retention ratio was calculated, as shown in Table 4.

TABLE 4

| Battery ID | Capacity recovery (%) | Factor of resistance increase (–fold) | Capacity retention ratio after 300 cycles (%) |
|---|---|---|---|
| B-1 | 80.4 | 1.55 | 81.3 |
| B-2 | 80.0 | 1.60 | 80.5 |
| B-3(D-3-30) | 91.5 | 1.19 | 90.5 |
| B-4 | 92.2 | 1.16 | 91.7 |
| B-5 | 83.7 | 1.42 | 83.6 |
| B-6 | 86.2 | 1.33 | 85.6 |
| C-3 | 92.2 | 1.14 | 92.0 |
| D-3-10 | 85.7 | 1.47 | 83.3 |
| D-3-20 | 91.8 | 1.18 | 91.6 |
| D-3-40 | 91.6 | 1.17 | 91.1 |
| D-3-50 | 91.6 | 1.16 | 91.3 |
| D-3-60 | 92.1 | 1.16 | 91.8 |
| D-3-70 | 92.5 | 1.14 | 91.0 |
| D-3-80 | 91.2 | 1.19 | 89.2 |
| D-3-90 | 86.1 | 1.41 | 84.6 |
| E-3 | 77.8 | 1.73 | 66.9 |

Figure 3:
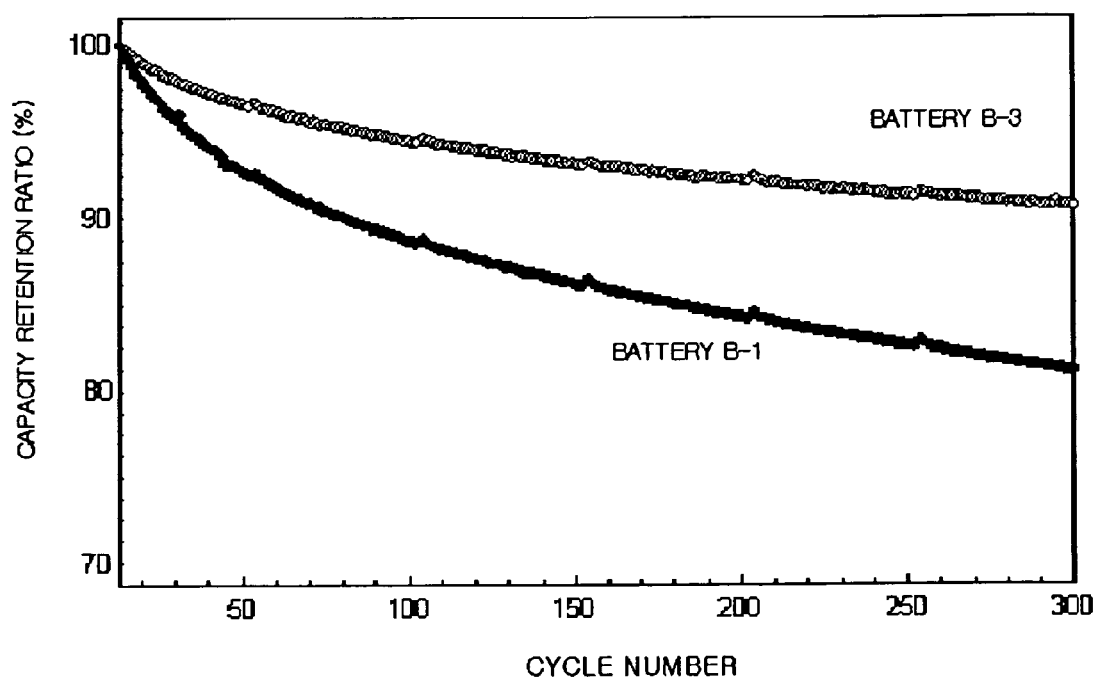
FIG. 3 shows a capacity retention ratio in the secondary batteries in Examples.

From Table 4 and FIG. 3, the following finding was obtained. The evaluation results of the lithium manganates in Table 2 indicate that a secondary battery comprising, as a positive electrode active material, a lithium manganate and a lithium nickelate in which "x" in the above-shown formula (1) is within the range of $0.15 \leq x \leq 0.24$, has a higher capacity recovery rate, a lower resistance increase rate and a higher capacity retention ratio after a 300 cycle test. Additionally, among those in which "x" in the above-shown formula (1) is within the range of $0.15 \leq x \leq 0.24$, a positive electrode active material comprising a lithium manganate prepared using $Li_2CO_3$ with a $D_{50}$ of 2 μm by two-step calcination and a lithium nickelate was used to provide a secondary battery with the further improved properties. In such a lithium manganate, no steps around 3.3 V are observed. Such a lithium manganate has a preferable property of smaller Mn elution, suitably ensuring stability. A positive electrode active material comprising the lithium manganate as described above and the lithium nickelate can be used to provide a secondary battery with excellent properties.

Furthermore, it has been demonstrated that a $LiNi_{0.8}CO_{0.2}O_2$ content of 20 wt % to 80 wt % both inclusive can further improve battery properties. Such batteries have exhibited good storage properties at an elevated temperature and good safety. It has been also demonstrated that amorphous carbon can be used in a negative electrode to obtain a higher capacity recovery rate and prevention of increase in a resistance. It has been also found that $LiNi_{0.8}Co_{0.15}Al_{0.05}O_2$ can be used as a lithium nickelate to further improve battery properties.

What is claimed is:

1. A positive electrode active material for a secondary battery comprising a lithium manganate and a lithium nickelate, wherein said lithium manganate is a particle compound having a spinel structure represented by the following formula (1) or said compound in which some of Mn or O sites are replaced with another element; and an Mn elution amount when immersing said particles in a mixture comprising an electrolyte salt and a carbonate solvent is 1000 ppm or less as determined by inductive coupling plasma emission analysis; and a specific surface area of said particles as determined by the BET method is 0.3 m²/ g to 0.8 m²/g both inclusive:

$$Li_{1+x}Mn_{2-x}O_4 \tag{1}$$

(in said formula (1) above, 0.15 x 0.24).

2. The positive electrode active material for a secondary battery according to claim 1, wherein said lithium nickelate is a compound represented by the following formula (2) or said compound in which some of Co or O sites are replaced with another element:

$$LiNi_{1-y}Co_yO_2 \tag{2}$$

(in said formula (2) above, $0.05 \leq y \leq 0.5$).

3. The positive electrode active material for a secondary battery according to claim 1, wherein said lithium nickelate is a compound represented by the following formula (3):

$$LiNi_{1-\alpha-\beta}CO_\alpha M_\beta O_2 \tag{3}$$

(in said formula (3) above, M comprises at least one of Al and Mn; $0.1 \leq \alpha \leq 0.47$; $0.03 \leq \beta \leq 0.4$; and $0.13 \leq \alpha + \beta \leq 0.5$).

4. The positive electrode active material for a secondary battery according to claim 1, wherein said lithium nickelate is a compound represented by the following formula (4):

(4)

(in said formula (4) above, M comprises at least one of Al and Mn; $0.1 \leq p \leq 0.5$; $0\ 03 \leq q \leq 0.5$; and $0.13 \leq p+q > 1$).

5. The positive electrode active material for a secondary battery as claimed in claim 1, wherein when a weight ratio of said lithium manganate to said lithium nickelate is a: (100-a), "a" is in a range of $20 \leq a \leq 80$.

6. A positive electrode for a secondary battery comprising said positive electrode active material for a secondary battery as claimed in claim 1, which is bound via a binder.

7. A secondary battery comprising at least a positive electrode and a negative electrode, comprising said positive electrode active material for a secondary battery as claimed in claim 1.

8. The secondary battery as claimed in claim 1, wherein said negative electrode comprises amorphous carbon as a negative electrode active material.

9. The positive electrode active material for a secondary battery according to claim 1, wherein a Mn elution amount of said lithium manganate particles is 1000 ppm or less.

* * * * *

UNITED STATES PATENT AND TRADEMARK OFFICE
CERTIFICATE OF CORRECTION

PATENT NO. : 7,556,889 B2
APPLICATION NO. : 10/522594
DATED : July 7, 2009
INVENTOR(S) : Tomokazu Kumeuchi, Tatsuji Numata and Daisuke Kawasaki It is certified that error appears in the above-identified patent and that said Letters Patent is hereby corrected as shown below:

Col. 19, Claim 4, line 7 delete "$q>1$", insert -- $q<1$ --.

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,556,889 B2
APPLICATION NO. : 10/522594
DATED : July 7, 2009
INVENTOR(S) : Tomokazu Kumeuchi, Tatsuji Numata and Daisuke Kawasaki It is certified that error appears in the above-identified patent and that said Letters Patent is hereby corrected as shown below:

Column 18, line 50, delete ".15 x .24" and insert -- $.15 \leq x \leq .24$ --.

Signed and Sealed this

Thirty-first Day of August, 2010

David J. Kappos
*Director of the United States Patent and Trademark Office*